United States Patent
Lindahl et al.

(10) Patent No.: US 7,759,910 B2
(45) Date of Patent: Jul. 20, 2010

(54) SYSTEM FOR TRANSMISSION OF ELECTRIC POWER

(75) Inventors: Sture Lindahl, Lund (SE); Kenneth Johansson, Västerås (SE); Udo Fromm, München (DE); Stefan Johansson, Västerås (SE)

(73) Assignee: ABB Research Ltd., Zürich (CH)

( * ) Notice: Subject to any disclaimer, the term of this patent is extended or adjusted under 35 U.S.C. 154(b) by 84 days.

(21) Appl. No.: 10/573,383

(22) PCT Filed: Sep. 13, 2004

(86) PCT No.: PCT/SE2004/001316

§ 371 (c)(1), (2), (4) Date: Nov. 13, 2006

(87) PCT Pub. No.: WO2005/031940

PCT Pub. Date: Apr. 7, 2005

(65) Prior Publication Data

US 2007/0114978 A1    May 24, 2007

(30) Foreign Application Priority Data

Sep. 26, 2003    (SE) .................................... 0302574

(51) Int. Cl.
*G05F 1/70*    (2006.01)
(52) U.S. Cl. .................................................... 323/207
(58) Field of Classification Search ................ 323/205, 323/207, 206, 248, 251, 255, 355, 361; 363/34, 363/35, 51; 307/100, 103, 104
See application file for complete search history.

(56) References Cited

U.S. PATENT DOCUMENTS

| | | | | |
|---|---|---|---|---|
| 3,934,174 A | * | 1/1976 | Bleibtreu et al. | 361/9 |
| 3,955,134 A | | 5/1976 | Woodford | |
| 4,075,675 A | * | 2/1978 | Burkett et al. | 361/48 |
| 4,081,741 A | * | 3/1978 | Palmer | 323/340 |
| 4,591,963 A | * | 5/1986 | Retotar | 363/17 |

(Continued)

FOREIGN PATENT DOCUMENTS

WO    WO 02073767 A1    9/2002

OTHER PUBLICATIONS

Watson et al.; "Surge Potential on Underground Cable Sheath and Joint Insulation"; Jun. 1963; IEEE Transaction on Power Apparatus and Systems; vol. 82, Issue 66; pp. 239-249.*

*Primary Examiner*—Adolf Berhane
*Assistant Examiner*—Emily Pham
(74) *Attorney, Agent, or Firm*—Venable LLP; Eric J. Franklin

(57) ABSTRACT

A high voltage AC transmission cable system for transmitting power between two points, each connected to one or more power networks, and a method to operate the system. At least one transformer is arranged at each end of the AC transmission cable, wherein at least one of the transformers is arranged to operate the transformer at a voltage whereby losses due to reactive power transport and dielectric losses are minimized. The AC cable is run at a variable voltage regulated such that the voltage is a function of the load for the transmission cable. This operating voltage is not necessarily the same as the nominal voltages in the connection points. A control and communication system and a graphical user interface for carrying out the method are also provided.

51 Claims, 8 Drawing Sheets

U.S. PATENT DOCUMENTS

| | | | |
|---|---|---|---|
| 4,713,720 A * | 12/1987 | Rogers et al. | 361/97 |
| 5,032,738 A * | 7/1991 | Vithayathil | 307/112 |
| 5,166,597 A * | 11/1992 | Larsen et al. | 323/215 |
| 5,349,283 A | 9/1994 | Jee | |
| 5,461,300 A * | 10/1995 | Kappenman | 323/215 |
| 5,530,338 A * | 6/1996 | Beckwith | 323/255 |
| 5,610,501 A * | 3/1997 | Nelson et al. | 323/207 |
| 5,698,969 A * | 12/1997 | Gyugyi | 323/207 |
| 5,734,257 A * | 3/1998 | Schauder et al. | 323/207 |
| 6,011,381 A * | 1/2000 | Andrei | 323/215 |
| 6,141,634 A * | 10/2000 | Flint et al. | 703/18 |
| 6,172,488 B1 | 1/2001 | Mizutani et al. | |
| 6,545,453 B2 * | 4/2003 | Glinkowski et al. | 323/356 |
| 6,577,108 B2 * | 6/2003 | Hubert et al. | 323/207 |
| 6,680,602 B2 * | 1/2004 | Iyoda et al. | 323/207 |
| 6,841,976 B1 * | 1/2005 | Sen et al. | 323/216 |
| 6,906,434 B1 * | 6/2005 | Koeppe et al. | 307/64 |
| 6,924,565 B2 * | 8/2005 | Wilkins et al. | 290/44 |
| 6,925,385 B2 * | 8/2005 | Ghosh et al. | 702/14 |
| 6,965,303 B2 * | 11/2005 | Mollenkopf | 370/485 |
| 7,235,900 B1 * | 6/2007 | Couture | 307/98 |
| 2004/0012472 A1 * | 1/2004 | Sasse et al. | 336/180 |
| 2004/0105635 A1 * | 6/2004 | Nandi et al. | 385/101 |

\* cited by examiner

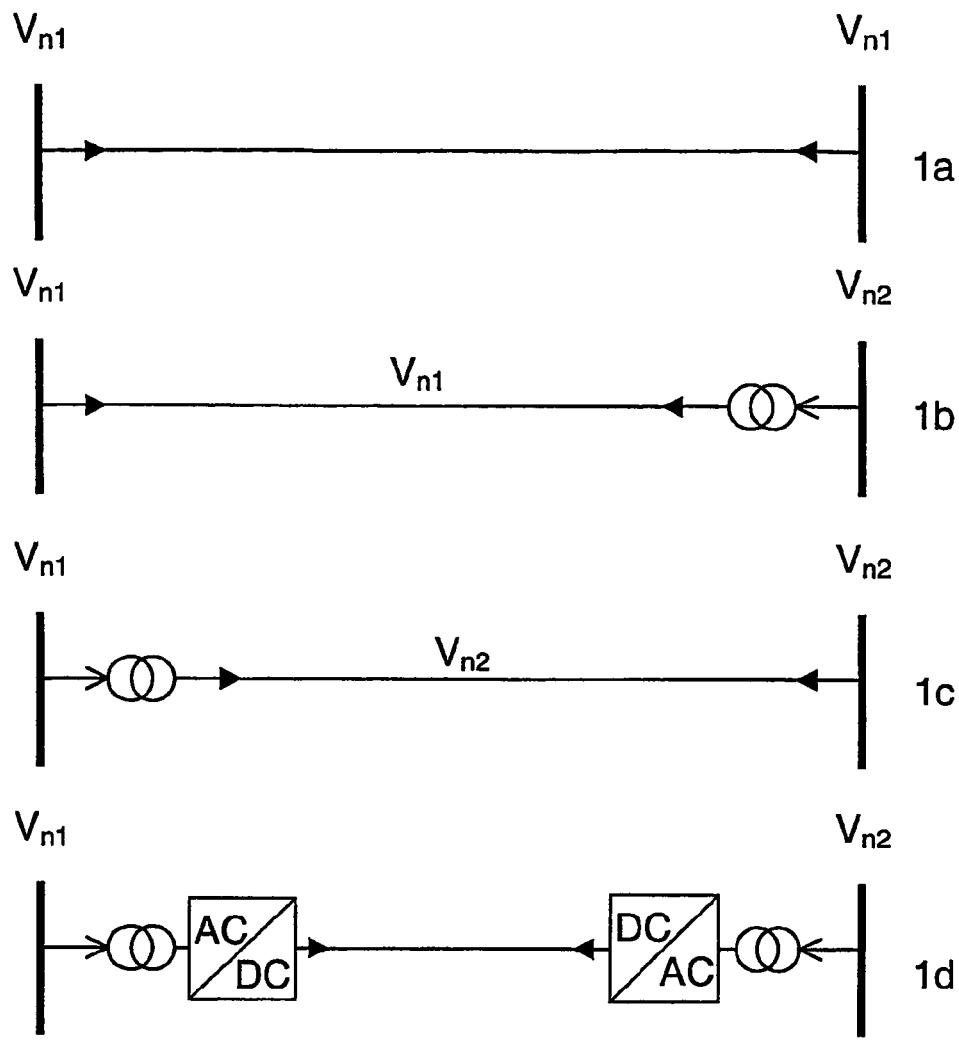
Figure 1a-d Prior Art
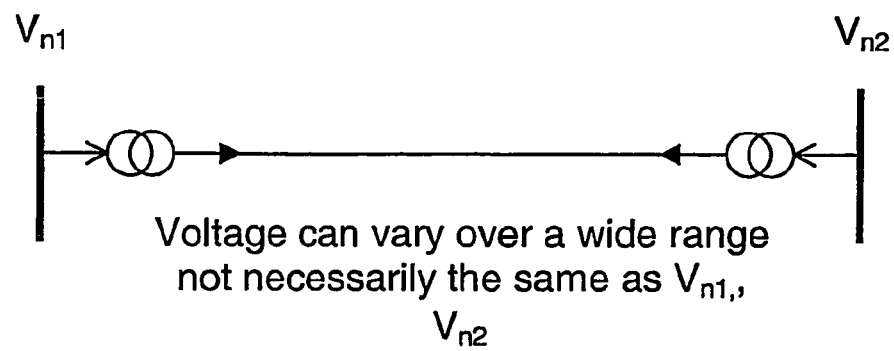
Voltage can vary over a wide range not necessarily the same as $V_{n1}$, $V_{n2}$
Figure 2

Shunt reactors

Variable transformers

SYSTEM FOR TRANSMISSION OF ELECTRIC POWER

CROSS-REFERENCE TO RELATED APPLICATIONS

This application claims priority to Swedish patent application no. 0302574-9 filed 26 Sep. 2003 and is the national phase under 35 U.S.C. §371 of PCT/SE2004/001316.

TECHNICAL FIELD

The invention relates to AC transmission cable systems for power transmission within and between power networks. In particular, the system is concerned with minimising power losses associated with power transmission due to effects of reactive charging losses as well as resistive and dielectric losses.

BACKGROUND ART

Energy transmission by means of power cables is of particular importance applied in densely populated areas and when passing over stretches of open water. In densely populated areas land values, reliability and aesthetic factors have great importance whereas for passage over open water the costs of building large number of pylon foundations is what steers the choice towards cable solutions. The problem with extending existing transmission cable installations is principally with generation and transport of reactive power. The risks of resonance problems for very long cable connections as a result of harmonics in the power network also needs to be reduced. Losses due to currents induced in the cable screen can also affect the maximum transmission length for cable circuits.

With shorter transmission cable circuits of less than, say 50 km, shunt compensation is used in order to compensate for the cable losses due to capacitive generation effects. Sometimes an additional dynamic compensation in the form of SVC, Static Var Compensation, is required. The shunt compensation devices are usually installed at both ends of the cable. There are also examples of installations where shunt compensation devices are installed at several places along the cable. AC transmission cables circuits longer than approximately 50 km or so only exist for low voltage levels (typically<100 kV) and low power (<100 MVA). High voltage direct current (HVDC) installations are today used almost exclusively for long power cable transmission circuits.

SUMMARY OF THE INVENTION

The present invention solves one or more of the above problems. In a first aspect of the invention an AC transmission cable system is provided which comprises at least one transformer arranged for a wide range of voltage transformation and capable of being regulated such that the voltage across the transmission reach may be varied so as to optimise the instantaneous power transmitted to a level of a natural load for the cable in use. The natural load is defined to be the load when the cable system in principle does not absorb or generate reactive power at either end. The term cable system is used to designate one or several reaches of power cable and shunt reactors connected at the joints between cable reaches. Shunt reactors at the cable terminal may or may not be included in the cable system. The AC transmission cable system described is also capable of being regulated such that the voltage across the transmission reach may be varied so as to reduce dielectric and resistive losses to a minimum. The AC transmission cable system described comprising also associated joints, terminals, breakers and protection devices is further capable of being regulated such that voltage across the transmission reach may be varied so as to minimise no-load power losses.

In another aspect of the invention a method is described for regulating the AC transmission cable system at a voltage that dependent on the natural load of the cable thus minimising reactive power losses, dielectric losses and resistive losses, especially under no-load conditions.

In another further aspect of the invention the short circuit current through the invention is reduced at low power flow loads. The tap changing will increase the cable impedance according to the square of the tap ratio. The invented cable system will therefore not contribute as much as today's solution to short circuit currents. This means that more circuits can be parallelized during low load increasing the reliability of electric energy supply.

In another, further aspect of the invention a control and communication system is described for carrying out communication and control functions actions of the methods for regulating the AC transmission cable system at a voltage that is dependent on the load of the cable.

In yet another, further aspect of the invention a graphical user interface (GUI) is described for displaying operating parameters of the described AC transmission system.

In order to minimize reactive power losses, the invention uses an effect or a phenomenon known as the Natural Load or Surge Impedance loading for a transmission conductor, which is defined (see definition above) and may be expressed as:

$$P_{natural} = \frac{V^2}{Z_v} \tag{0}$$

where V is voltage and $Z_v$ is (the real part of) the surge impedance. This load level is especially beneficial where the transmission cable consumes the same amount of reactive power per unit length as it generates. Reactive power therefore does not need to be transmitted in any direction. By taking the power flow through the cable reach at the level of $P_{actual}$ the cable can be operated at natural load by means of regulating the voltage level V according to an equation such as:

$$V = \sqrt{Z_v \cdot P_{actual}}$$

The FIGS. 5A, B, C, D shows an example of an 130 kV circuit. It may be operated in either of two modes. The first mode A, B is in a conventional way of the Prior Art, which means held at a constant voltage all the time. The second mode is in a voltage dependent mode, "Voltage Dependent Cable Transmission (VDCT)", that is according to the invention and equation (0) above. In the lower right corner of FIG. 5 in the plot D we can see that the conventional operation in this case will generate some 40 MVAr capacitive power in each end which must be compensated for. This compensation also causes further electrical losses that occur in the reactors. The voltage dependent cable transmission of the invention almost balances the reactive production by varying the voltage. Any discrepancy is due to the resistive voltage drop in the cable reach. The invention therefore reduces unnecessary reactive power production and thereby decreases the resistive losses associated with this unnecessary transport. However, as well as the resistive losses, there are also considerable losses due to dielectric effects in the cable and to resistive losses in the compensation equipment, typically reactors. These losses can also be minimised according to the present invention.

The relation between resistive losses and dielectric losses may be calculated. The following calculation, for example, is valid for a single point along an AC transmission circuit:

In the calculation of cable voltage optimisation at a point, we considered a power cable that can operate at variable voltage as described above and in equation (1) and derive the optimal cable voltage. We are assuming that the total active cable losses are equal to the sum of resistive losses and dielectric losses. We assume that the resistive losses are proportional to the square of the current and the dielectric losses are proportional to the square of the voltage. In this study, we introduce the following quantities:

$U_n$ is the rated voltage of the cable [V]
$I_n$ is the rated current of the cable [A]
$S_n$ is the rated apparent power $S_n=U_n I_n$ of the cable [VA]
$P_f$ is the total losses [W]
$P_{fd}$ is the dielectric losses at rated voltage [W]
$P_{fr}$ is the resistive losses at rated current [W]
$P_{fn}$ is the total losses at rated current and rated voltage [W]

We introduce the following non-dimensional quantities:
X is the non-dimensional voltage $U/U_n$
Y is the non-dimensional current $I/I_n$
S is the non-dimensional apparent power $S/S_n$
Z is the non-dimensional losses $P_f/S_n$
C is the relative dielectric losses $P_{fd}/P_{fn}$ Equation (1) gives the non-dimensional cable losses:

$$z = cx^2 + (1-C)y^2 \qquad (1)$$

We want to minimize z subject to the following restrictions:

$$xy = s \qquad (2)$$

$$x_m \leq x \leq 1 \qquad (3)$$

$$y \leq 1 \qquad (4)$$

We combine equation (1) and (2) to obtain:

$$z = cx^2 + (1-c)\frac{s^2}{x^2} \qquad (5)$$

Now we differentiate (5) with respect to x and obtain:

$$\frac{dz}{dx} = 2cx - 2(1-c)\frac{s^2}{x^3} \qquad (6)$$

A necessary condition for extremum is that $dz/dx=0$, which gives:

$$cx^4 = (1-C)s^2 \qquad (7)$$

The preliminary result, which does not reflect the restrictions (3) and (4) is:

$$x_1 = \sqrt[4]{\frac{1-c}{c}s^2} \qquad (8)$$

To show that equation (8) gives a minimum value we calculate the second derivative of the losses by differentiating equation (6) with respect to Z.

$$\frac{d^2z}{dx^2} = 2c + 6(1-c)\frac{s^2}{x^4} \qquad (9)$$

Now we combine equation (8) and equation (9) to obtain:

$$\frac{d^2z}{dx^2} = 2c + \frac{6(1-c)s^2 c}{(1-c)s^2} = 2c + 6c = 8c > 0 \qquad (10)$$

The second derivative of the losses with respect to voltage is always greater than zero and equation (8) gives the minimum losses. We may presume that the unconstrained minimum is not always a feasible solution that takes into account that we have a limited regulating range $X_m < X < 1$ for the voltage and an upper limit $y<1$ for the current. First, we modify the preliminary voltage given by equation (8) with respect the voltage limits.

$$x_2 = \min[\max(x_1, x_m), 1] \qquad (11)$$

We may now calculate a preliminary current as follows.

$$y_1 = \frac{s}{x_2} \qquad (12)$$

Now, we modify this preliminary current with respect to the current limit.

$$y = \min(y_1, 1) \qquad (13)$$

We may now calculate the final value of the cable voltage as follows:

$$x = \frac{s}{y} \qquad (14)$$

FIG. 7 shows the optimal voltage as a function of cable loading. Balanced losses mean that the resistive losses are equal to the dielectric losses at rated current and rated voltage (C=0.5). Low dielectric losses means that c=0.2 while low resistive losses means that c=0.8.

FIG. 8 shows the optimal current as a function of cable loading, see Balanced Losses.

FIG. 9 shows the Resistive and dielectric losses as a function of cable loading.

FIG. 10 shows the loss reduction for a cable with low Dielectric Losses.

FIG. 11 shows the loss reduction for a cable with balanced losses for Constant voltage, Variable voltage respectively.

FIG. 12 shows the Loss reduction for a cable with high dielectric losses for Constant voltage, Variable voltage respectively.

If we study the whole cable, Equation 2 becomes $$xy = s(d)$$

where d is the distance from one end. We minimize the function $$\int_0^{length} s(d)\,dd$$

with respect to voltage and end up with the operating voltage of the cable transmission system.

The overall conclusion as a result of this combined minimisation of the unnecessary reactive power flow, and the optimal voltage to reduce dielectric and resistive losses, calculated for one point in the cable, will give a minimum of total losses in the transmission cable.

The principal advantage of the invention is that minimal power losses due to reduced dielectric and resistive losses mean that the length of an AC transmission cable reach according to the invention is not limited to around 50 km or so but may in fact be several hundred kilometers in length. This is so because the in the prior art method and system of shunt reactors to compensate for reactive power generation are only effective for a circuit lengths of up to 50 km or so as the resistance and impedance of the circuit is a function of the circuit length. For the invention, no reactive power is transmitted and so no shunt reactors are required to compensate, thus there is virtually no limit to circuit length caused by generation or transport of reactive power. This provides then AC power transmission cable systems with significantly lower power losses in operation that may link together power networks which are hundreds of kilometers apart in a way that is more economical to build than the Prior Art, which has to-have reactive power compensation equipment installed at least every 50 km or so.

Another advantage of the invention is that reactive power compensation by shunt reactors is not required at the ends of a transmission circuit or, even more disadvantageously, at intervals along the length of a prior art circuit. Instead, a transformer with wide transformation variability is required at each end of the circuit, and the circuit has to be operated with variable voltage. A transformer of some sort is almost always required at the end of a transmission circuit, so that an installation according to the invention is both less expensive to build and, with significantly lower power losses, less expensive to operate. Reactive power shunt reactors also have power losses associated with them.

For example, the power loss due to dielectric and charging power losses for an AC transmission cable under no-load are reduced by as much as one-third or more, which, when the number of many power networks that are run at no-load every night is taken into consideration, provides a great environmental and economic benefit. Further, in a particular embodiment of the invention a wide range transformer may only be required at one end of the transmission circuit.

Another advantage of the invention is that the thermal overload capacity of the cable in a transmission circuit described is greater than for Prior Art cable systems. This permits greater freedom in running under temporary overloads to ease problems in a power network.

BRIEF DESCRIPTION OF THE DRAWINGS

A more complete understanding of the method and system of the present invention may be had by reference to the following detailed description when taken in conjunction with the accompanying drawings wherein:

FIG. 1a shows in a simplified diagram an example of an HV AC cable transmission circuit for a system between two points connected to power networks according to the Prior Art; FIG. 1b shows a simplified diagram for a system with an HV AC cable transmission circuit and a transformer according to the Prior Art, and FIG. 1c shows a similar diagram for a system with a transmission cable and one transformer. FIG. 1d shows a simplified diagram for a HVDC cable system with a transmission cable and two AC/DC rectifiers according to the Prior Art.

FIG. 2 shows schematically a system comprising a transmission circuit and two transformers arranged between two points connected to power networks according to an embodiment of the invention;

DESCRIPTION OF THE PREFERRED EMBODIMENTS

FIG. 1a (Prior Art) shows a HVAC transmission cable of which the nominal operating voltage $V_{n1}$ is the same at both ends of the line. If the nominal operating voltage at each end is not the same, $V_{n1} \ne V_2$, one possible Prior Art arrangement is shown in FIG. 1b, where the operating voltage for the cable is $V_{n1}$ and a transformer is installed at one end of the cable. FIG. 1c shows the same arrangement except for that the nominal operating voltage for the cable is $V_{n2}$. If the distance for AC transmission between terminal points is too great, HVDC technology may be used, as shown in FIG. 1d. In this Prior Art arrangement the problem of reactive power losses is overcome by rectifying from AC to DC current.

FIG. 2 shows an embodiment according to the present invention. It can be seen by comparing the invention of FIG. 2 to the prior art arrangements illustrated in FIGS. 1a-d that the cable voltage in the system according to the invention does not necessarily have to be the same as one of the nominal operating voltages $V_{n1}$, $V_{n2}$, of the connection points. Operating voltage can vary over a large range not necessarily the same as either $V_{n1}$ and/or $V_{n2}$. The operating voltage of the cable may vary during power transmission operation and, with coordinated control of the tap changers or equivalent in the transformers resistive losses can be minimized, as will also dielectric losses which will be more fully described below.

Figure 3:
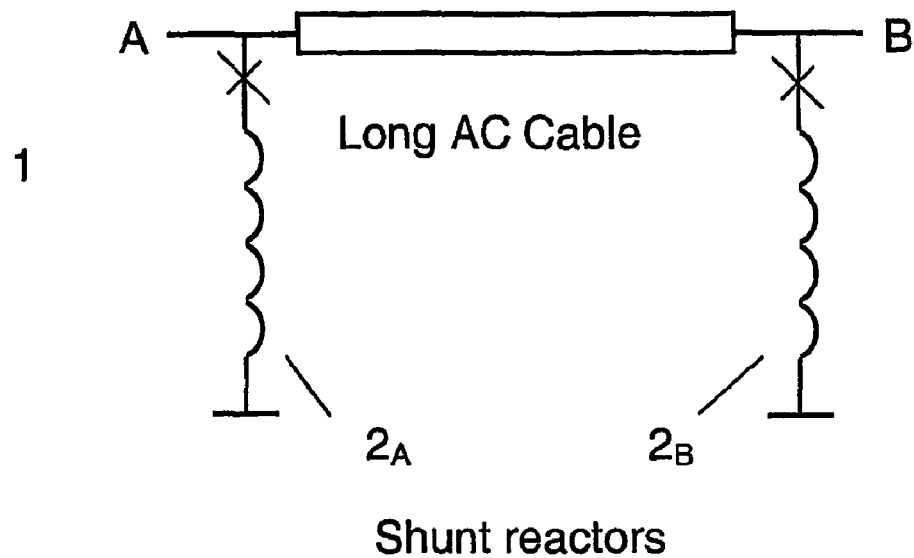
FIG. 3 shows in a schematic diagram system with an HV AC cable transmission circuit and two shunt reactors arranged between two points connected to power networks according to the Prior Art.

FIG. 3 (Prior Art) shows a transmission circuit 1 arranged between two points A, B, including an AC cable and two shunt reactors $2_A$, $2_B$ for compensation of reactive power.

Figure 4:
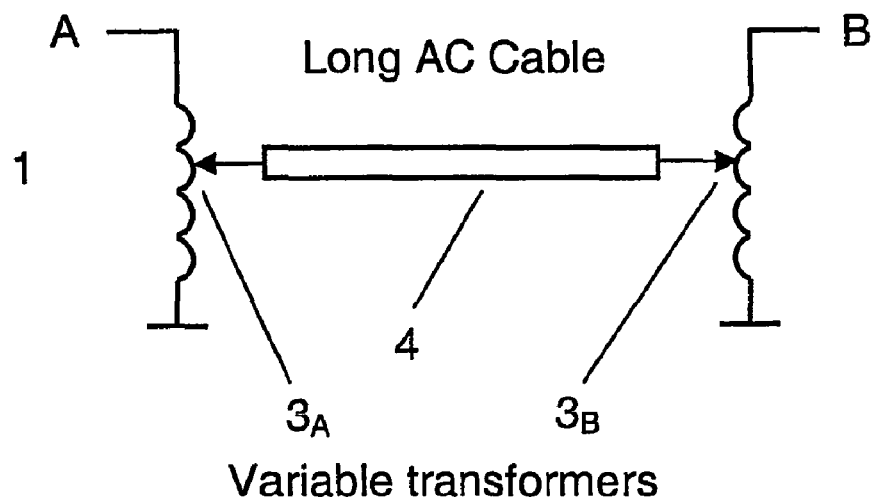
FIG. 4 shows schematically a system comprising a transmission circuit and two variable transformers arranged between two points connected to power networks according to an embodiment of the invention.
Figure 5:
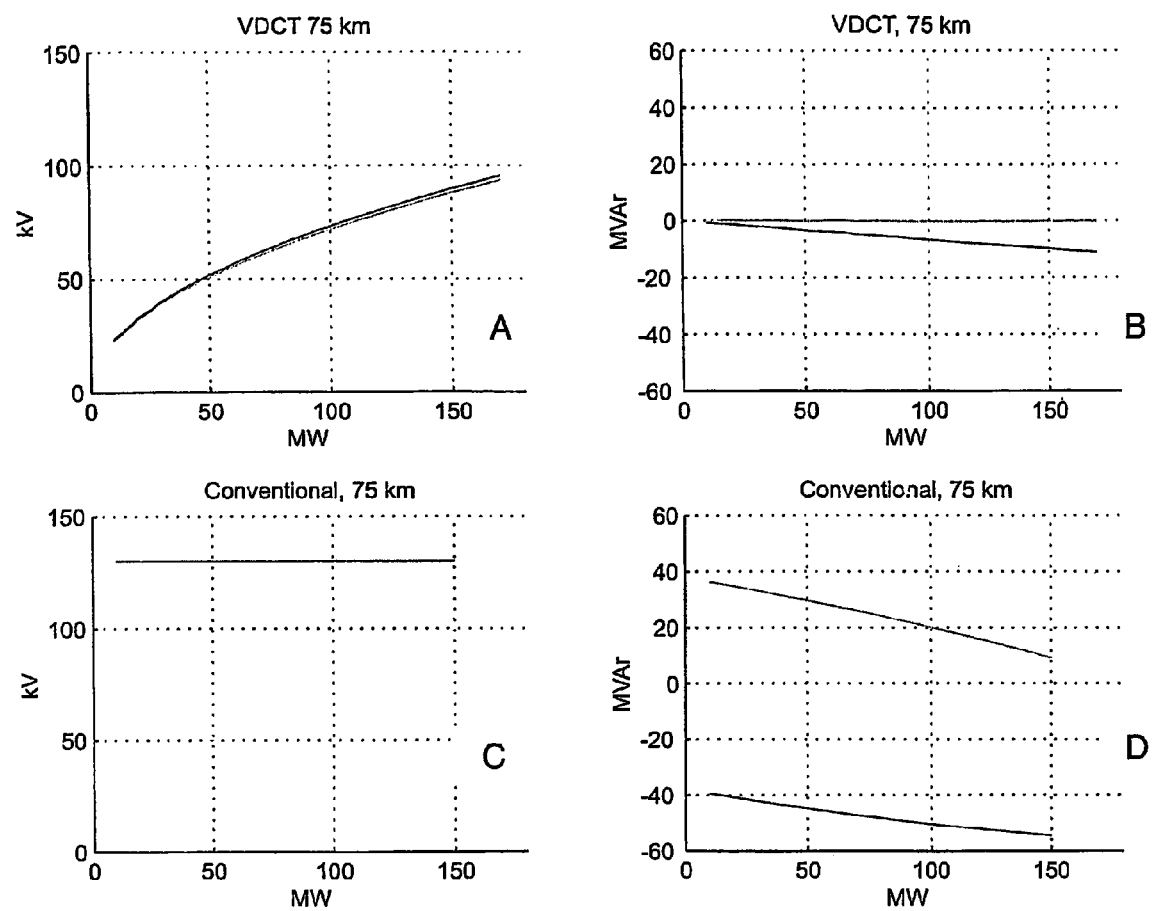
FIG. 5C, D show characteristic operating values for an AC cable reach according to the Prior Art.
FIG. 5A, B shows the corresponding operating values for an AC transmission reach according to an embodiment of the invention.

FIG. 4 shows a transmission circuit 1 according to an embodiment of the invention. The transmission circuit 1 is arranged between two points A, B. Two transformers $3_A$, $3_B$ with variable turn ratios are shown, one at each end of the cable 4 reach.

When voltage is dynamically regulated with the goal of operating a cable reach at Natural Load under as greater part of the time as possible then shunt compensation of the Prior Art such as FIG. 3 can be avoided. The voltage is adjusted with the help of two transformers $3_A$, $3_B$ each with voltage transformation variable between 1:1 and typically 1:2 with the aid of tap changers. Because natural load varies according to the square of the voltage the variable voltage transformation makes it possible to vary the natural load in the interval from 25 to 100% of the natural load at highest voltage for equipment. Low load conditions, for example during a summer night in Sweden, are about ¼ of the maximum load during a winter day which, in principle, is covered by the indicated transformation ratios. At the same time it is possible to add a phase shifting tap changer in order to increase the ability to regulate active effect.

The solution according to the invention may advantageously use autotransformers in those situations where the nominal voltage levels between the two ends of the cable reach are not very great. Methods to limit the short-circuit currents at voltage transformations of 1:1 for an autotransformer may be introduced if found necessary.

A problem with existing transmission cables is that surge impedance is relatively low which gives a high natural load in relation to the cable diameters that are practical or preferred for manufacturing reasons. Therefore it is possible and would be preferable to influence the natural load level of cables by adjusting the surge impedance of the cables to a favourable value.

One can further carry out parts of the adjustment between higher and lower voltages in greater steps with the aid of one or more breakers, preferably of the fast-acting type. FIG. 4 shows schematically another embodiment and system in which it is possible with two parallel cables to rapidly disconnect and re-connect one of the cables upon the occurrence of transients in the power network.

Figure 6:
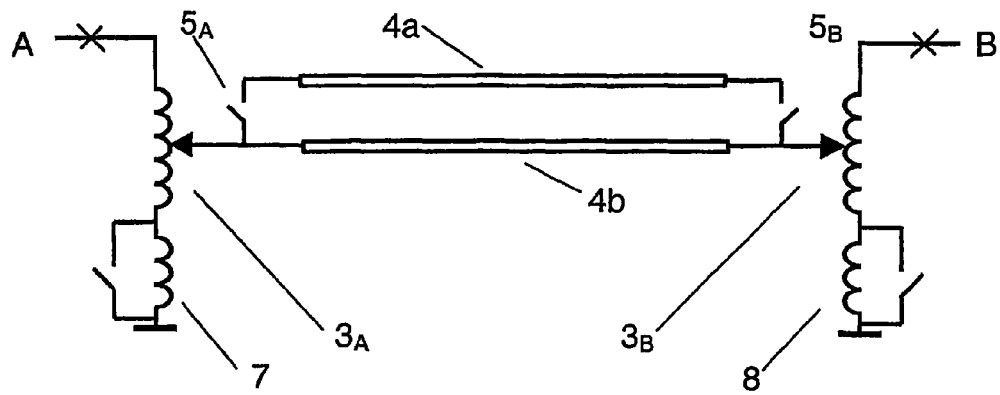
FIG. 6 shows a system with two parallel AC transmission cables and two fast-acting breakers connected between two points A, B to power networks according to another embodiment of the invention.

FIG. 6 shows two parallel AC cables, 4a, 4b, arranged with fast acting breakers $5_A$, $5_B$ connected between two points A, B. An autotransformer $3_A$, $3_B$ is shown at each end A, B of the reach. In each autotransformer a rapid by-pass member 7, 8 is shown. These by-pass switches may be designed so as to manage any turn-to-turn short circuits that may occur within the transformer due to these switches. Similar designs as for tap changers may be necessary. Where the autotransformer comprises a tap changer, then the rapid by-pass member is an electro-mechanical device arranged to by pass or short circuit one or more taps very rapidly. Where the tap changer is of the electronic type, IGBT based or similar, the rapid by-pass member is not required. Thus, parts of the transformer winding may be by-passed so as to compensate quickly for the change. When using a transformer equipped with a tap changer the mechanical movements necessary to switch between one point in the windings and another take a finite amount of time.

These methods are also useable if the flow of power through the transmission cable reach increases or decreases transiently. The voltage level of the power transmission then requires a relatively fast adjustment to the new power level. The speed of adjustment required is difficult to achieve with electro-mechanical tap changers. It is preferable for the cable reach system to uses electronic tap changers, for example IGBT, IGCT, GTO or thyristor-based solutions, so that the disconnect and re-connect can be carried out with satisfactory speed.

Figure 11:
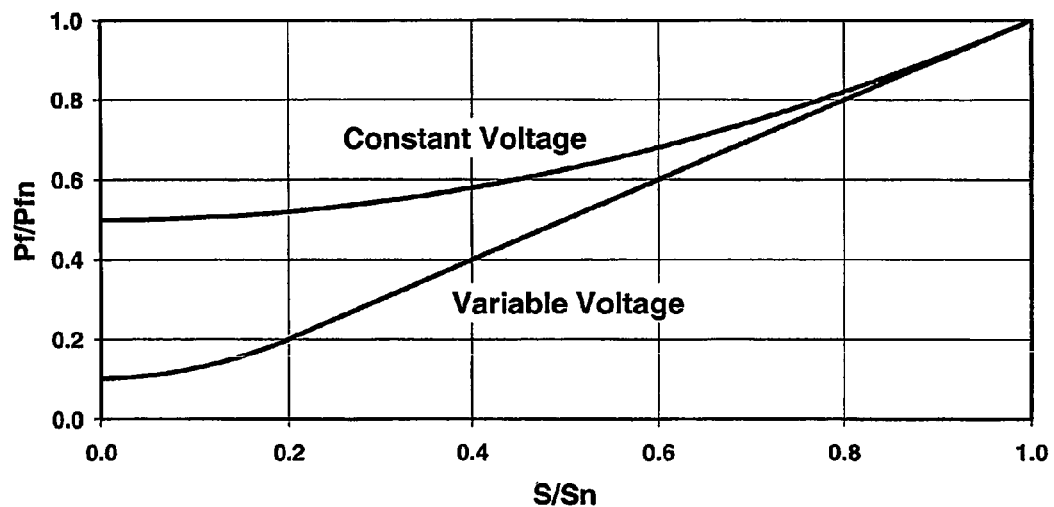
Figure 12:
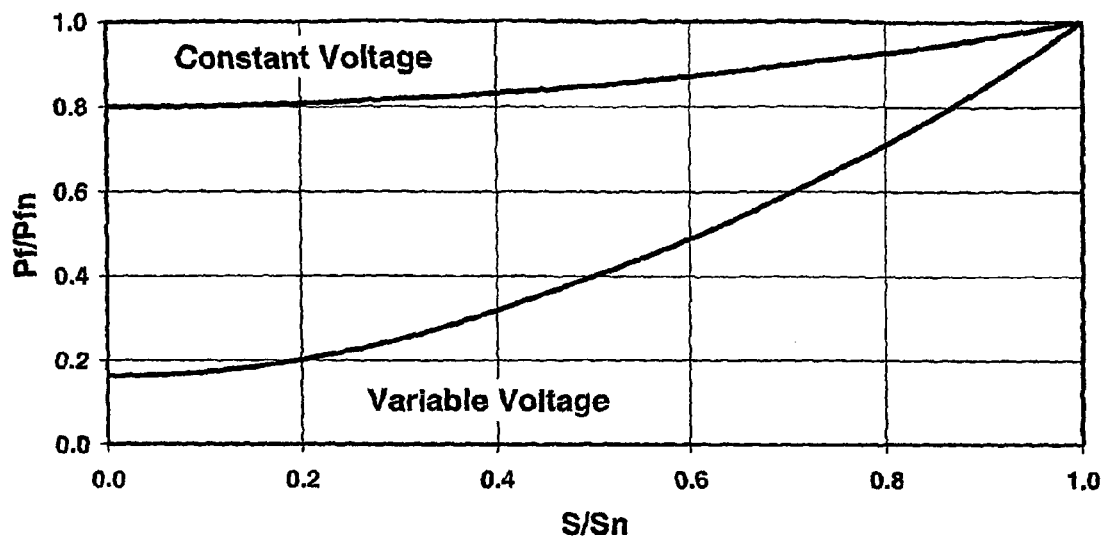
Figure 13:
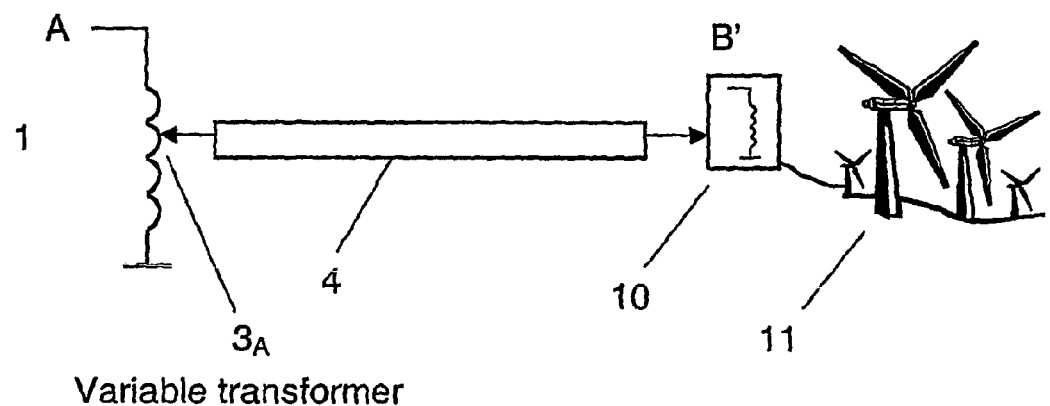
FIG. 13 shows schematically a system with a transmission circuit between two points connected to power networks using an HV transmission cable and only one wide range transformer according to another embodiment of the invention.

FIG. 11 shows an AC transmission circuit between two points A, B' connected to power networks using only one wide range $3_A$ transformer. At the other end B' the cable reach is connected via a transformer 10 without any tap changer to one or more electrical machines that are electrically isolated from the rest of the system, in this example, wind generators or wind turbines of a Wind Park 11. In this alternative embodiment the transformer $3_A$ at network end A regulates the voltage in the way described in this description. At the other end, the electrical machines in the wind park control their output voltage level so as to minimize losses of power transfer between the wind park 11 and point A. A benefit of this arrangement is that the cable reach from, say, a wind park to an electrical grid may be constructed for distances greater than 50 km, run at minimized dielectric and resistive losses and require the provision of only one tap changer equipped transformer $3_A$. By means of this alternative embodiment of the invention a wind park of a given MVA output may provide a much greater net power than prior art arrangements delivered to the power network. Separate voltage control of each wind turbine is possible with full power electronic converters connected in series with the wind turbine, by means of a double fed induction machine or a synchronous generator. Coordinated control between the tap changer transformer and the individual wind turbines is possible where a central computer calculates the cable operating voltage giving the lowest losses. Due to varying power production from the wind farm it is likely that the range is larger than 1:1 to 1:2 of the tap changer transformer.

A second source of power losses in a power cable is dielectric losses, typically primarily dependent on heat or polarisation losses within the cable insulation. Here below follows an example calculated on the basis of an existing power transmission cable in Scandinavia.

Generally speaking the dielectric losses are approximately proportional to the square of the voltage. The invention also reduces these losses by operating at a lower voltage level. A simple numerical demonstration of this may be calculated in reference to a 400 kV mass-impregnated AC-cables between Sweden and the island of Zealand (Denmark) as an example:

Oil-Paper Cable
420 kV operating voltage
870 MVA power transmitted
11.4 km long
1200 A rated current
Conductor losses: 32.8 kW/km and phase, 85 degrees
Sheath and Armouring losses: 34 kW/km and phase
Dielectric losses: 8.4 kW/lm and phase
(See reference [1] page 340, equations 12.37, 2.39)

1. Assume that resistive losses in conductor and sheet are proportional to current squared:

$$l_c = 2\pi f C U_0$$

where $l_c$ is the charging current, f is the system frequency, C is cable capacitance and $U_0$ (V) is the phase-to-ground voltage.

2. The charging losses are then (from [1])

$$W_{ch} = 2\left[\frac{1}{3}I_c^2\left(\frac{L}{2}\right)^3 \cdot R\right]$$

where $W_{ch}$ are the charging losses, and R is the resistance of the cable.

At maximum load we have 75.2 kW/phase, km losses
This gives a resistance of (32.8+34)/1200^2=0.0464 Ohm Then we have for todays no-load situation:
Charging current=17.5 A/phase
Charging loses=2*⅓*17.5^2* (11.4/2)^3*0.0464=1754 kW, phase
Dielectric losses=11.4*8.4=95 kW/phase
The cable produces 11.4*17.5*sqrt(3)*420=145 MVAr
This corresponds to 1450 kW in SVC losses
Current at connection point=17.5*11.4/2=100 A/phase
Total losses at no load=6.9 Mw If we reduce operating voltage from 420 to 300 kV, we arrive at:
Charging current=12.5 A/phase
Charging losses=2*⅓*12.5^2* (11.4/2)^3*0.0464=894 kW, phase
Dielectric losses=11.4*4.3=49 kW/phase
The cable produces 11.4*12.5*sqrt(3)*300=74 MVAr
This corresponds to 377 kW in SVC losses
Current at connection point=12.5*11.4/2=71 A/phase
Total losses at no load=3.2 MW If we reduce operating voltage further to 200 kw, phase we arrive at:
Charging current=9.75 A/phase
Charging losses=2*⅓*9.75^2* (11.4/2)^3*0.0464=544 kw, phase
Dielectric losses=11.4*1.9=22 kW/phase
The cable produces 11.4*9.75*sqrt(3)*200=39 MVAr
This corresponds to 104 kW in SVC losses
Current at connection point=9.75*11.4/2=56 A/phase
Total losses at no load=1.8 MW The savings in terms of power that no longer has to be generated to feed the normal losses under no-load are clearly very great. This example demonstrates that a transmission cable arranged according to the invention would consume no-load losses of only about one-third, or less, of an existing transmission cable reach.

With the invented system arrangement and method of controlling the voltage the reactive power flows can be drastically reduced, and both resistive and dielectric losses can be reduced. Another important result is that the reduced no-load losses will result in a slightly cooler cable. This can be either be used to allow for temporary overload of the cable i.e. introduce a temperature dependent dynamic rating, or instead to reduce the specification and thereby material costs and manufacturing costs for the cable.

Figure 7:
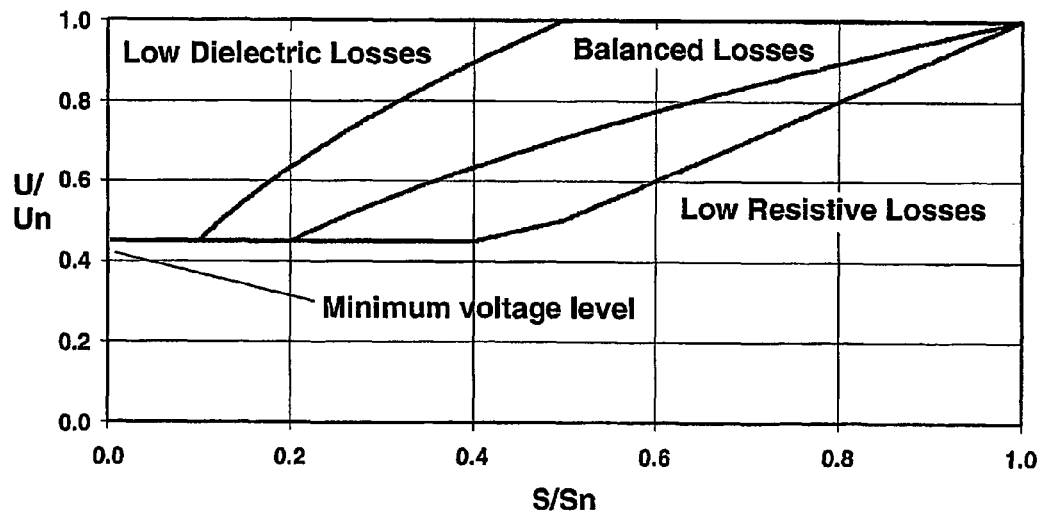
FIGS. 7-12 show characteristic operating parameters calculated about a point in an AC transmission reach according of the invention.
Figure 8:
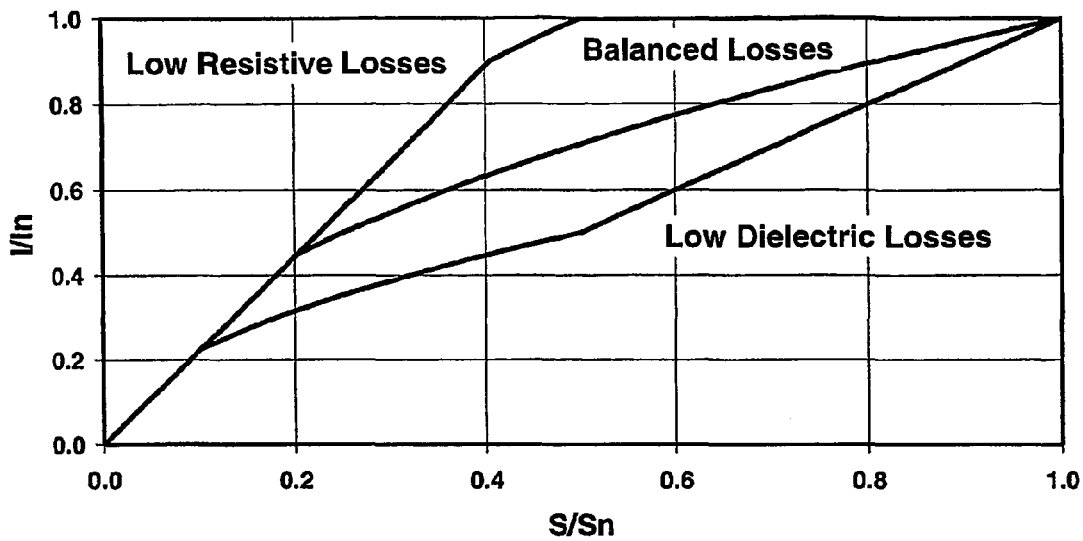
Figure 9:
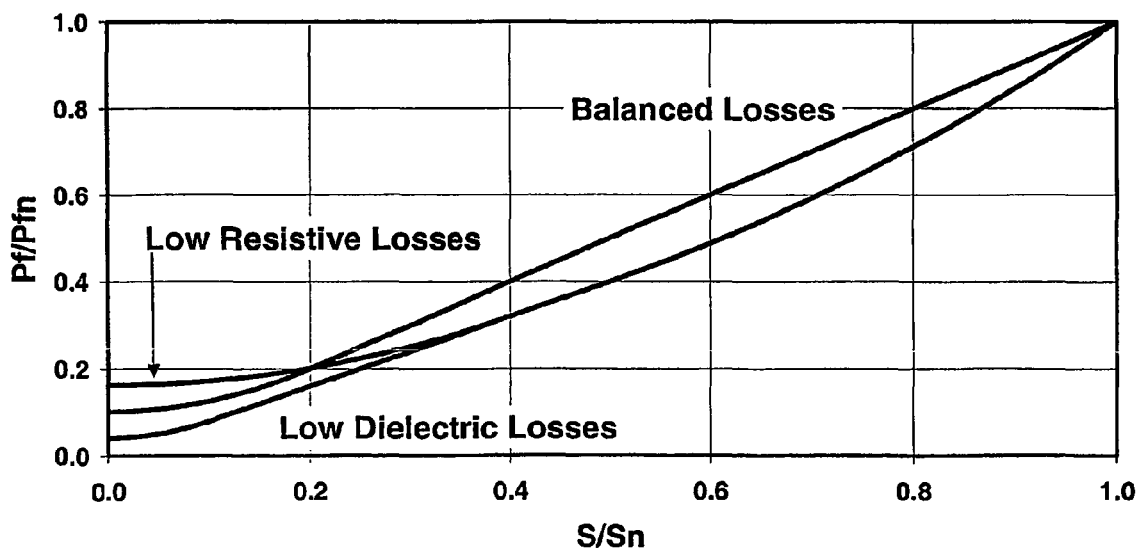
Figure 10:
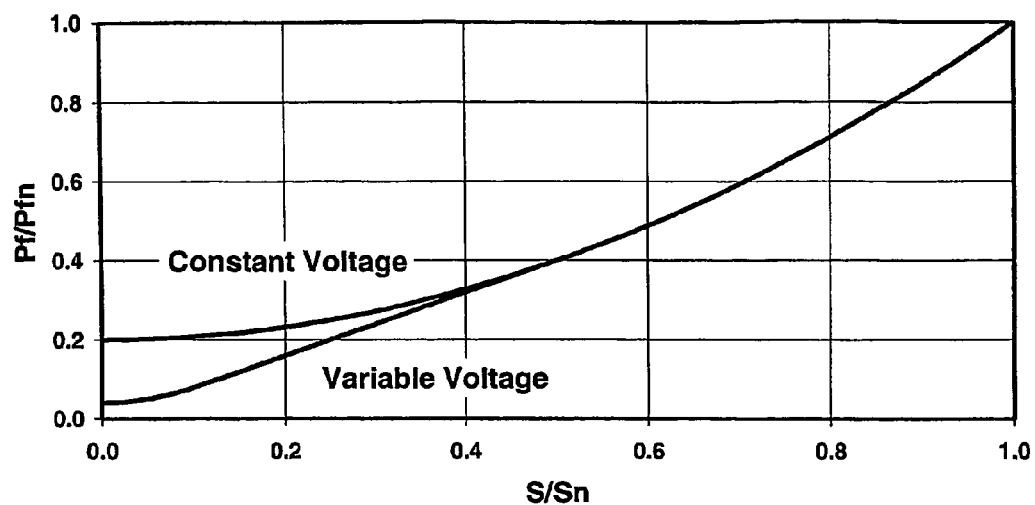

The reactive power in this example, no load situation, is not reduced to zero and it may not be practical to reduce voltage further than a minimum level in other real cases. At low loads the voltage optimisation may also be at a minimum voltage level which is not equal to zero, such as the minimum level shown in FIG. 7.

The cable system may comprise standard equipment for AC over-voltage protection and-shielding. This may include for example transposings and sheath sectionalizing insulators fitted to the cables to reduce shield induced currents. Similarly, to guard against known disturbances in long AC circuits such as overtones the system may be equipped with a high frequency filter such as for frequencies of around 100 Hz or higher.

Figure 14:
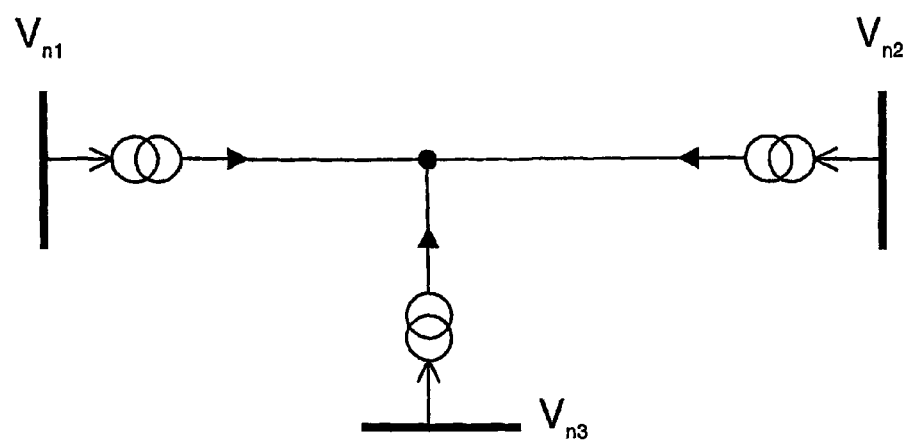
FIG. 14 shows schematically a system including a transmission circuit and at least three transformers arranged between more than two points each connected to power networks according to another embodiment of the invention.

FIG. 14 shows an additional embodiment of the invention wherein the inventive cable transmission system comprises a third connection point.

Methods of the invention may also be practised, carried out, monitored and implemented by means of a system for control comprising a system for communication. Each of the two transformers $3_A$, $3_B$ are controlled and regulated in a synchronous or coordinated manner to regulate the operating voltage V of the AC transmission cable. Effective control is enabled by means of high speed communication of data and values for voltage and other parameters from and to control systems or components for transformers located at any end of the AC transmission cable. Such real time values for operating parameters may be displayed by means of a Graphical User Interface (GUI), a graphical or textual display on an operator workstation, running on a user's logged-in computer, connected direct to a local, central, regional or international power network control system; or connected via a main or local control server or other control system computer.

Figure 15:
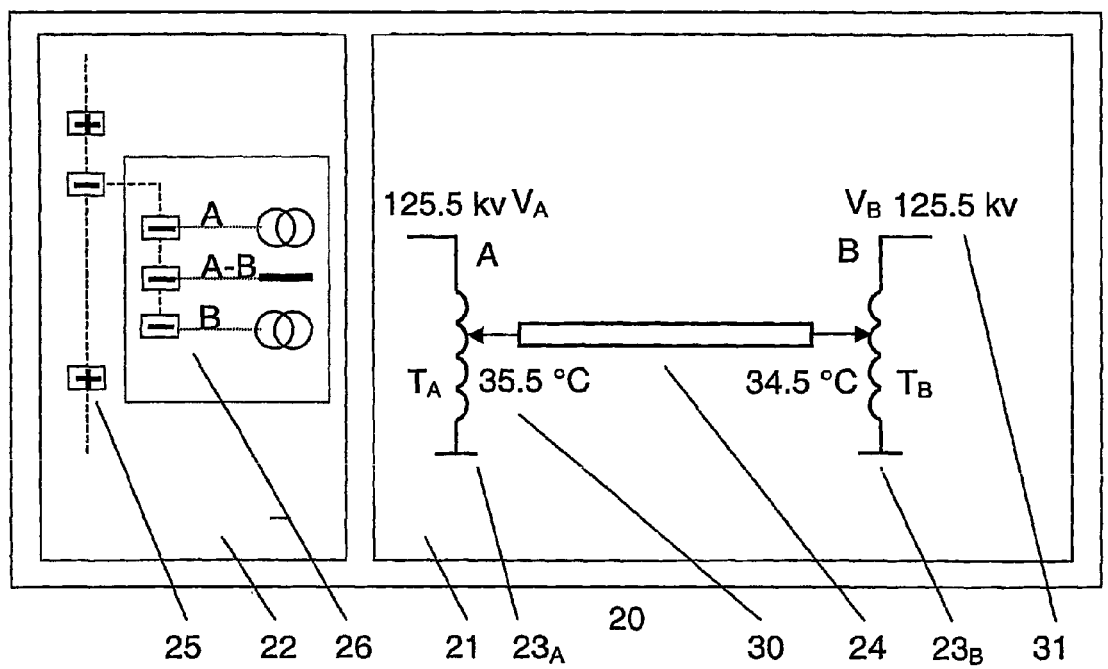
FIG. 15 shows schematically a graphic user interface for displaying operating parameters of the described AC transmission system and/or to carry out one or more methods of the invention.

FIG. 15 shows schematically an example for a graphical user interface for displaying operating parameters of the described AC transmission system and/or to carry out one or more methods of the invention. The figure shows a GUI 20, comprising two parts or panes, 21, 22. Pane 21 includes a schematic of two variable transformers, $23_A$, $23_B$ at either end of a cable reach 24, which corresponds with cable 4 in the invention as shown in FIG. 4. The GUI shows in panel 21 values such as a voltage 31 for the voltage at point B and temperatures such as temperature 30 for a temperature of a variable transformer $23_A$. The GUI shows in another window or panel, such as pane 22 another schematic for a part of a network or for an installation. A display in the form of a Windows NT type tree 25 includes network installations and equipment, such as the A-B cable reach 26 shown here as selected for access and thus shown in detail in the second panel 21. An operator or a process running in a computer may use the GUI interface and application to examine data and values such as 30, 31 for a transmission cable reach A-B, in particular one or more voltages and temperatures, and carry out a control action. In a preferred embodiment one of more object oriented control system applications of the Industrial IT product range supplied by ABB may be used to provide control and/or supervisory functions, and the necessary GUI applications for presenting, displaying and generating such relevant control actions.

It should be noted that while the above describes exemplifying embodiments of the invention, there are several variations and modifications which may be made to the disclosed solution without departing from the scope of the present invention as defined in the appended claims.

REFERENCES

[1] Anders, George J., Rating of electric power cables: ampacity calculations for transmission, distribution, and industrial applications. Pages 340-341. IEEE Press power engineering. ISBN 0-7803-1177-9

The invention claimed is:

1. A high voltage insulated AC transmission cable system for transmitting power between two points each connected to one or more power networks, comprising:
   an insulated AC transmission cable having two ends and extending between the two points;
   two transformers with variable voltage transformation, wherein each of the two transformers is arranged in shunt connection at one of the two points at one of the two ends of the insulated AC transmission cable;
   two voltage control members, each of which is arranged at one of the two points and is connected to one of said two transformers and which are operative to control said two transformers in a coordinated manner to regulate an operating voltage level of said insulated AC transmission cable whereby losses due to reactive power transport are minimized; and
   two tap-changers, each of which is arranged at one of the two points and is connected to one of the two voltage control members and to a corresponding one of said transformers to vary the voltage transformation of the transformer according to said operating voltage.

2. The system according to claim 1, wherein each the voltage control member is operative to operate said system at an optimal voltage dependent on a surge impedance of the cable and an instantaneous power level.

3. The system according to claim 1, wherein each the voltage control member is operative to operate said system at an optimal voltage dependent on an instantaneous power level equal to a Natural Load of the cable.

4. The system according to claim 1, wherein each the voltage control member is operative to operate said system at a voltage whereby a sum of resistive losses, dielectric losses and charging losses are minimized.

5. The system according to claim 1, wherein each the voltage control member is arranged for communication with control equipment at both ends of said insulated AC transmission cable.

6. The system according to claim 1, wherein each the voltage control member is arranged with control instructions for operation of said insulated AC transmission cable under thermal overload conditions during limited periods of time.

7. The system according to claim 1, wherein each of the transformers is arranged to operate with a wide ratio of input voltage to output voltage of between 1:1 to 1:2, or greater.

8. The system according to claim 1, wherein each the voltage control member comprises a power electronic device which may be any of the list of: IGBT, IGCT, GTO, Thyristor, Diode.

9. The system according to claim 1, wherein each the voltage control member comprises a mechanical tap-changer.

10. The system according to claim 9, wherein each tap-changer comprises a phase-shifting tap changer.

11. The system according to claim 1, wherein each voltage control member is comprised in an autotransformer.

12. The system according to claim 1, wherein each voltage control member is an autotransformer.

13. The system according to claim 1, wherein each transformer is arranged to limit short-circuit currents.

14. The system according to claim 1, further comprising: a high frequency filter.

15. The system according to claim 1, wherein transformer windings of each transformer comprise at least one transformer winding arranged for a fast short-circuit of a part of the transformer windings.

16. The system according to claim 1, further comprising: one or more parallel cables for each phase, wherein each cable is arranged for rapid disconnect and reconnect.

17. The system according to claim 16, further comprising: one or more breakers arranged for rapid disconnect and reconnect.

18. The system according to claim 16, further comprising: one or more tap changer by-pass connectors.

19. The system according to claim 1, wherein the insulated AC transmission cable comprises an oil and paper insulated cable.

20. The system according to claim 1, wherein the insulated AC transmission cable comprises an XLPE insulated cable.

21. The system according to claim 1, further comprising: one or more over-voltage protection devices, phase-to-phase, phase-to-earth, depending on the cable.

22. The system according to claim 1, further comprising: one or more elements operative to protect a sheath of the insulated AC transmission cable from overvoltage.

23. The system according to claim 1, further comprising: a cable system shield comprising transposings and sheath sectionalizing insulators reducing shield induced currents.

24. The system according to claim 1, wherein one end of the insulated AC transmission cable may be connected to one or more electrical machines isolated from the rest of the system.

25. The system according to claim 24, wherein the transformer arranged nearest the one or more electrical machines has a fixed transformation ratio or comprises off-load tap-changers only.

26. The system according to claim 24, wherein voltage regulation of the one or more electrical machines is controlled according to natural load and minimize losses principle applied to a tap changer.

27. The system according to claim 1, further comprising: a high speed data communication member connected to at least one of said transformers for communication with control voltage control member.

28. The system according to claim 1, further comprising: a graphical user interface comprising at least one object oriented application for presenting data, parameter values and control actions for operating parameters of the insulated AC transmission cable system.

29. A method to control a high voltage insulated AC transmission cable system for transmitting power between two points connected to one or more power networks, the method comprising:
arranging two transformers with variable voltage transformation with one at each of the two points, such that each transformer is in shunt-connection at one of two ends of an insulated AC transmission cable extending between the two points;
controlling said transformers in a coordinated manner to regulate an operating voltage level of said insulated AC transmission cable, whereby losses due to reactive power transport are minimized, wherein said operating voltage may differ from a voltage of said one or more power networks; and
arranging two tap-changers with one at each of the two points, each of which is to vary the voltage transformation of one of said transformers according to said operating voltage.

30. The method according to claim 29, further comprising: regulating the voltage dependant on a function of a natural load of said insulated AC transmission cable, and thereby controlling a level of reactive power transported into any of said one or more power networks.

31. The method according to claim 30, wherein the voltage is regulated dependent on the natural load, whereby losses at due to resistive, dielectric effects are minimized.

32. The method according to claim 31, wherein the voltage is regulated under no-load conditions such that losses are reduced while maintaining voltage above a lower, minimum voltage level depending on system conditions.

33. The method according to claim 31, wherein the voltage is regulated under low load conditions such that losses are reduced while maintaining voltage above a lower, minimum voltage level depending on system conditions.

34. The method according to claim 29, further comprising: regulating the voltage dependent in part on an equation of the form:

$$v = \sqrt{Z_v \cdot P_{actual}}$$

where V is voltage, $Z_v$ is the real part of the surge impedance and $P_{actual}$ is the present active power flow.

35. The method according to claim 29, further comprising:
regulating the voltage dependent on thermal overload limits for the insulated AC transmission cable during limited periods of time.

36. The method according to claim 29, further comprising:
rapidly reconnecting and disconnecting supply to and from the insulated AC transmission cable.

37. The method according to claim 29, further comprising:
regulating the voltage with the two transformers that are operated synchronously with each other.

38. The method according to claim 29, further comprising:
utilizing the high voltage insulated AC transmission cable system as a power feeder for large, densely populated urban or suburban areas.

39. The method according to claim 29, further comprising:
utilizing the high voltage insulated AC transmission cable system for transmitting power over a distance, wherein a part of the distance is across water.

40. The method according to claim 29, further comprising:
utilizing the high voltage insulated AC transmission cable system for transmitting power between two points wherein one point comprises one or more electrical machines isolated from an electrical power network.

41. A high voltage insulated AC transmission cable system for transmitting power between two points each connected to one or more power networks, the system comprising:
two transformers with variable voltage transformation, each of which is arranged at one of the two points in shunt connection at one of two ends of the insulated AC transmission cable;
two voltage control members, each of which is arranged at one of the two points and is connected to one of said two transformers and which are operative to control said two transformers in a coordinated manner to regulate an operating voltage level of said insulated AC transmission cable dependent on the surge impedance of the cable whereby losses due to reactive power transport are minimized; and
two tap-changers, each of which is arranged at one of the two points and is connected to one of the two voltage control members and to a corresponding one of said two transformers to vary a voltage transformation of the voltage transformers according to said operating voltage.

42. The system according to claim 41, wherein the voltage control members are operative to operate said system at an optimal voltage dependent on the surge impedance of the cable and the instantaneous power level.

43. The system according to claim 41, wherein the voltage control members are operative to operate said system, at an optimal voltage dependent on an instantaneous power level equal to the Natural Load of the cable.

44. The system according to claim 41, wherein the voltage control members are operative to operate said system at a voltage whereby the sum of the resistive losses, dielectric losses and charging losses are minimized.

45. The system according to claim 41, wherein the voltage control members are arranged for communication with control equipment at both ends of said insulated AC transmission cable.

46. The system according to claim 41, wherein the voltage control members are arranged with control instructions for operation of said insulated AC transmission cable under thermal overload conditions during limited periods of time.

47. The system according to claim 41, further comprising:
a cable system shield comprising transposings and sheath sectionalizing insulators reducing shield induced currents.

48. The system according to claim 41, wherein one end of the insulated AC transmission cable may be connected to one or more electrical machines isolated from the rest of the system.

49. The system according to claim 48, wherein one of the two transformers arranged nearest the one or more electrical machines has a fixed transformation ratio or comprises off load tap-changers only.

50. A method to control a high voltage insulated AC transmission cable system for transmitting power between two points connected to one or more power networks, the method comprising:
arranging two transformers with variable voltage transformation with one at each of the two points, such that each of the transformers is in shunt-connection at one of the two points at two ends of an insulated AC transmission cable extending between the two points;
controlling said transformers in a coordinated manner to regulate an operating voltage level of said insulated AC transmission cable dependent on a surge of impedance of the insulated AC transmission cable, whereby losses due to reactive power transport are minimized, where said operating voltage may differ from a voltage of said one or more power networks; and
arranging two tap-changers with one at each of the two points, each of which is to vary the voltage transformation of one of said transformers according to said operating voltage.

51. The method according to claim 50, further comprising:
regulating the voltage dependant on a function of a natural load of said insulated AC transmission cable, and thereby controlling a level of reactive power transported into any of said one or more power networks.

* * * * *